United States Patent
Panhans

(10) Patent No.: US 11,505,720 B2
(45) Date of Patent: Nov. 22, 2022

(54) LOCALLY DEACTIVATED RELEASE COATING

(71) Applicant: Loparex Germany GmbH & Co. KG, Forchheim (DE)

(72) Inventor: Jürgen Panhans, Erlangen (DE)

(73) Assignee: LOPAREX GERMANY GMBH & CO. KG, Forchheim (DE)

( * ) Notice: Subject to any disclaimer, the term of this patent is extended or adjusted under 35 U.S.C. 154(b) by 0 days.

(21) Appl. No.: 17/252,654

(22) PCT Filed: Jul. 3, 2019

(86) PCT No.: PCT/EP2019/067789
§ 371 (c)(1),
(2) Date: Dec. 15, 2020

(87) PCT Pub. No.: WO2020/011609
PCT Pub. Date: Jan. 16, 2020

(65) Prior Publication Data
US 2021/0246335 A1    Aug. 12, 2021

(30) Foreign Application Priority Data

Jul. 11, 2018 (DE) .................... 10 2018 116 748.2

(51) Int. Cl.
*C09J 7/20* (2018.01)
*C09J 7/29* (2018.01)
(Continued)

(52) U.S. Cl.
CPC ................. *C09J 7/203* (2018.01); *C09J 7/29* (2018.01); *C09J 7/38* (2018.01); *C09J 7/403* (2018.01);
(Continued)

(58) Field of Classification Search
CPC ....... C09J 7/203; C09J 7/29; C09J 7/38; C09J 7/403; C09J 2203/346; C09J 2301/10;
(Continued)

(56) References Cited

U.S. PATENT DOCUMENTS 3,554,835 A * 1/1971 Morgan ..................... C09J 7/38
156/289
5,281,455 A   1/1994 Braun et al.
(Continued)

FOREIGN PATENT DOCUMENTS

DE    69212 081 T2    2/1997
DE    696 08 496 T2   1/2001
(Continued)

OTHER PUBLICATIONS

International Preliminary Report on Patentability, PCT Application No. PCT/EP2019/067789 dated Jul. 23, 2020.
(Continued)

*Primary Examiner* — Patricia L. Nordmeyer
(74) *Attorney, Agent, or Firm* — The Dobrusin Law Firm, P.C.

(57) ABSTRACT

The invention relates to a film comprising an optionally multilayer carrier layer; wherein one surface side of the carrier layer has been modified over part of its area either by surface activation or by printing with a print medium, such that the surface side has modified regions and unmodified regions; wherein the modified regions and the unmodified regions are coated over part or all of the area by a release material; and wherein the strength of adhesion of the release material to the carrier layer in the modified regions is different compared to the adhesion of the release material to the carrier layer in the unmodified regions.

20 Claims, 4 Drawing Sheets

Figure 1:
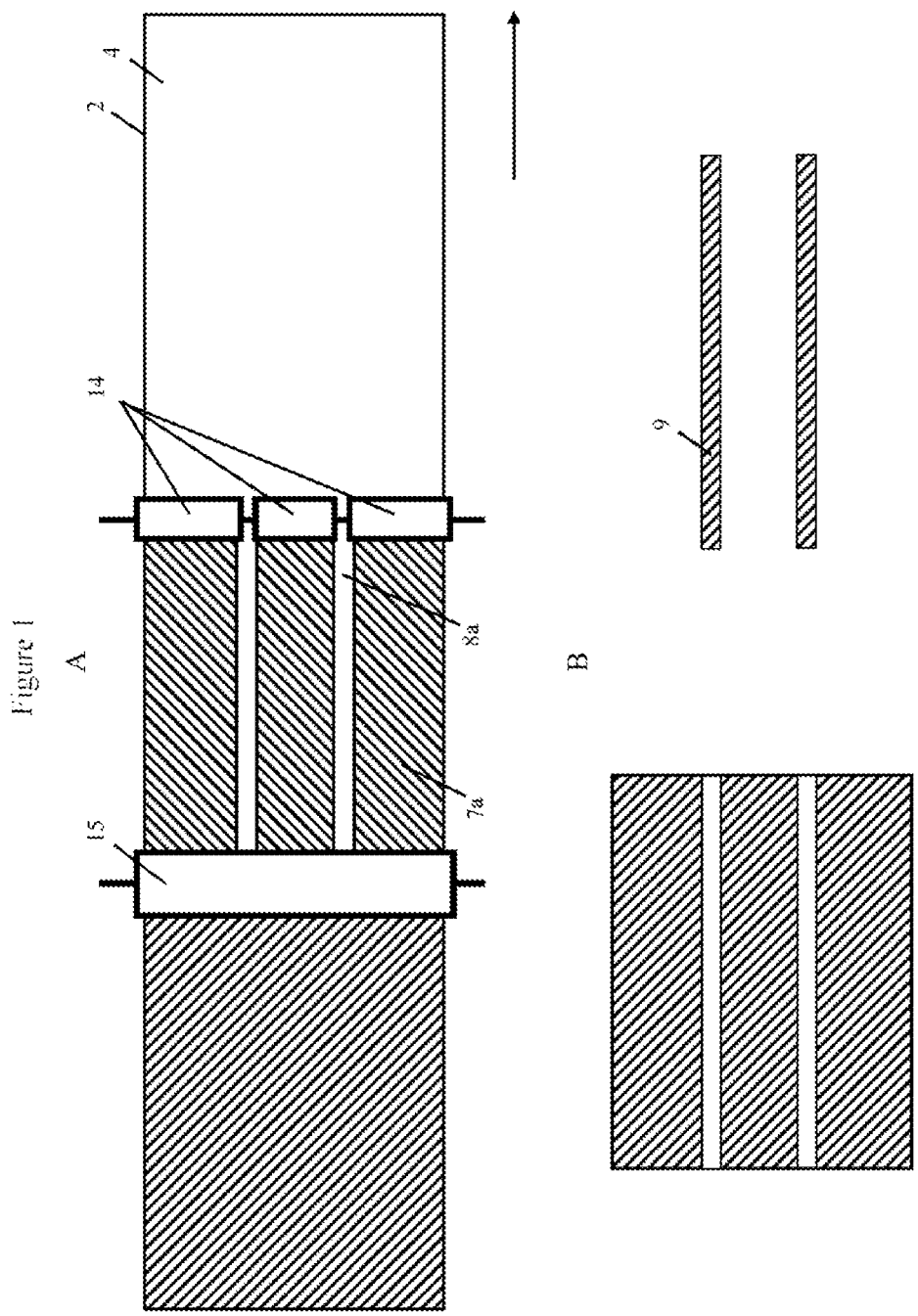

(51) Int. Cl.
*C09J 7/40* (2018.01)
*C09J 7/38* (2018.01)

(52) U.S. Cl.
CPC ...... *C09J 2203/346* (2020.08); *C09J 2301/10* (2020.08); *C09J 2301/21* (2020.08); *C09J 2401/006* (2013.01); *C09J 2427/006* (2013.01); *C09J 2433/006* (2013.01); *C09J 2475/006* (2013.01); *C09J 2477/006* (2013.01); *Y10T 428/1476* (2015.01)

(58) Field of Classification Search
CPC .............. C09J 2301/21; C09J 2401/006; C09J 2427/006; C09J 2433/006; C09J 2475/006; C09J 2477/006; Y10T 428/1476; B32B 5/026; B32B 2255/02; B32B 2255/10; B32B 2307/75; B32B 5/024; B32B 5/26; B32B 25/08; B32B 27/16; B32B 27/32; B32B 2255/12; B32B 25/06; B32B 2255/26; B32B 2307/732; B32B 2405/00; B32B 25/042; B32B 25/10; B32B 27/08; B32B 27/10; B32B 27/12; B32B 27/34; B32B 27/36; B32B 29/02
See application file for complete search history.

(56) References Cited

U.S. PATENT DOCUMENTS

| | | | |
|---|---|---|---|
| 5,591,290 A * | 1/1997 | Walter | C09J 7/38 156/247 |
| 5,840,419 A | 11/1998 | Alder | |
| 6,040,026 A | 3/2000 | Iwabuchi et al. | |
| 7,678,461 B2 | 3/2010 | Speith-Herfurth et al. | |
| 9,273,234 B2 | 3/2016 | Schmitzer et al. | |
| 9,623,630 B2 | 4/2017 | Engelhard | |
| 10,507,632 B2 | 12/2019 | Schuhmann et al. | |
| 10,737,474 B2 | 8/2020 | Hutt | |
| 2005/0142370 A1 | 6/2005 | Mussig | |

FOREIGN PATENT DOCUMENTS

| | | |
|---|---|---|
| DE | 101 32 534 A1 | 1/2003 |
| DE | 69718 883 T2 | 9/2003 |
| DE | 10 2005 029 722 A1 | 12/2006 |
| DE | 10 2010 006 379 A1 | 8/2011 |
| DE | 10 2010 025 938 A1 | 1/2012 |
| DE | 10 2011 117 831 A1 | 8/2012 |
| DE | 20 2014105 973 U1 | 1/2016 |
| DE | 10 2014 222 723 A1 | 5/2016 |
| DE | 10 2015 017119 A1 | 2/2017 |
| EP | 1069170 A1 | 1/2001 |
| GB | 1315516 | 5/1973 |
| WO | 2004/089621 A1 | 10/2004 |

OTHER PUBLICATIONS

International Search Report & Written Opinion, PCT Application No. PCT/EP2019/067789 dated Nov. 2, 2019.
German Search Report, DE Application No. 102018116748 dated Apr. 9, 2019.

* cited by examiner

Figure 3
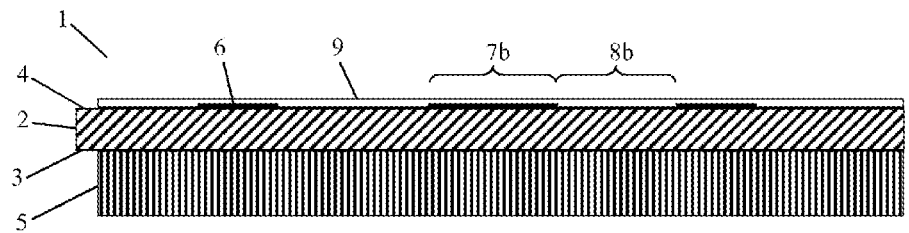
Figure 4A
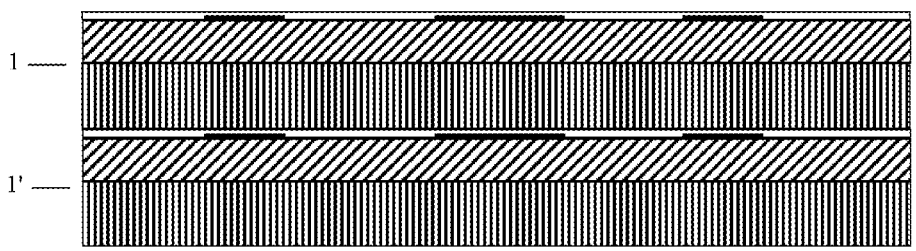
Figure 4B
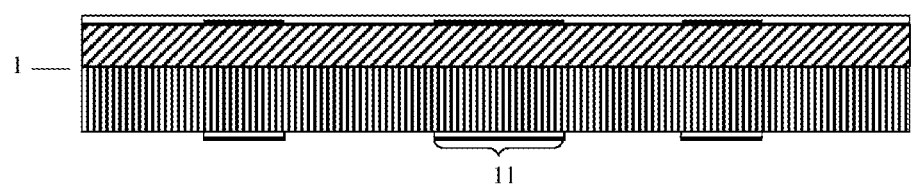
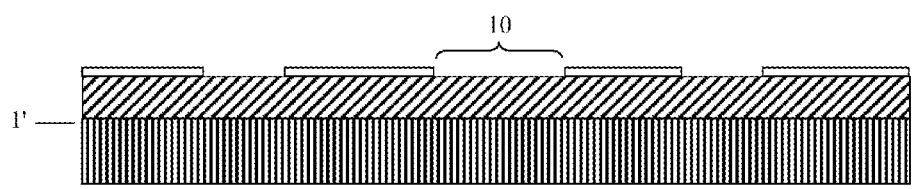

LOCALLY DEACTIVATED RELEASE COATING

The invention relates to a film which comprises an optionally multi-ply carrier layer; wherein one surface side of the carrier layer has had some of its area modified either by surface activation or by printing with a printing composition, so that the surface side has modified regions and also unmodified regions; wherein the modified regions and also the unmodified regions have had some or all of their area coated with a release material; and wherein the adhesion of the release material against the carrier layer in the modified regions is different in degree in comparison to the adhesion of the release material against the carrier layer in the unmodified regions.

Pressure-sensitive adhesives (PSAs) find use across a very wide variety of sectors of industry, including for the provision of self-adhesive surfaces. In order to protect self-adhesive surfaces from soiling, and generally from any premature deployment of their adhesive effect, they are in many cases lined with release films (release liners, release sheets). These release films are then peeled from the self-adhesive surfaces shortly before those surfaces are employed in their intended manner, and so the PSA located thereon is exposed and can be attached to a substrate, leading to the desired adhesion. The release films are then usually discarded.

An example of products with self-adhesive surfaces are bitumen sheets which are used in house building, especially for roofs. These bitumen sheets are frequently furnished with a self-adhesive surface lined with a release film. Shortly before the as-intended use of the bitumen sheets, the release film is removed and in this way the self-adhesive surface is exposed, and can then be attached, for example, to a building surface, where it is used to protect against effects of weathering. Difficulties arise if, on attachment of the bitumen sheets, air inclusions are formed between the self-adhesive surface and the building surface, causing the self-adhesive surface not to adhere over the full area of the building surface. Then, in the regions of the air inclusions, the amount of air between the self-adhesive surface and the building surface is so great that the PSA is unable to adhere to the building surface there. These air inclusions, though, are surrounded by regions in which the self-adhesive surface does adhere to the building surface, and the air inclusions are therefore unable to escape. Temperature fluctuations, which may be considerable in light of the incoming solar radiation, then result in the included air undergoing repeated expansion and contraction again, leading over time to weakening of the bitumen sheet and, in the worst case, to bursting or tearing. The consequence is a local leak, meaning that the desired action against effects of weathering can no longer be entirely assured.

Another example of products having self-adhesive surfaces are adhesive tapes, which are often wound into rolls against themselves. One of the two surface-side sides of the adhesive tapes is coated with a PSA, so forming a self-adhesive surface. The other of the two surface sides is coated with a release material, to which the PSA adheres in the rolled-up state. On account of the release effect, the adhesive tape can be detached from the roll, exposing the self-adhesive surface, which can then be attached, for example, to a building surface. Adhesive tapes of these kinds are occasionally used for the sealing of vapor retarders in roofs, in the marginal region of the vapor retarder, where the retarder has to be attached to rafters, purlins, beams, walls, etc. and has to be closed in an airtight way. Difficulties arise if such adhesive tapes have to be bonded with overlapping, owing to the construction circumstances or for other reasons. Because of the reverse-side coating with the release material, the self-adhesive surface of a strip of the adhesive tape of course exhibits only minimal adhesion on the reverse side of a previously bonded strip of the adhesive tape.

DE 101 32 534 A1 relates to a method for producing a film-backed adhesive tape, characterized in that an assembly of at least one extruded backing film layer and a layer of pressure-sensitive adhesive is biaxially oriented on one of the sides of the backing film layer.

DE 20 2014 105 973 U1 relates to a film having at least one layer comprising at least one homopolymer or copolymer, with a heat-protective varnish layer being applied over regions at least of said layer, and with a coating comprising at least one polysiloxane being applied over regions at least of the heat-protective varnish layer.

There is a demand for self-adhesively furnished products which overcome the disadvantages of the prior art.

It is an object of the invention to provide self-adhesively furnished products in which the air in potentially formed air inclusions is able to escape still after bonding. It is a further object of the invention to provide self-adhesively furnished products which before their as-intended use are wound against themselves, so removing the need for separate release films, and which can be bonded overlappingly with one another in an improved way.

This object is achieved by the subject matter of the claims.

A first aspect of the invention relates to a film comprising an optionally multi-ply carrier layer having a first surface side and an opposite second surface side; wherein the second surface side has had part of its area modified either by surface activation or by printing with a printing composition, so that the second surface side has modified regions and also unmodified regions; wherein the modified regions and also the unmodified regions have had some or all of their area coated with a release material; and wherein the adhesion of the release material against the carrier layer in the modified regions is different in degree in comparison to the adhesion of the release material against the carrier layer in the unmodified regions.

It has surprisingly been found that the release properties of release films can be weakened locally, thereby locally removing release material in the weakened regions, if a pressure-sensitive adhesive is taken off from the release material but remains in the unweakened regions.

It has further surprisingly been found that the weakened regions can be arranged on the surface of films in such a way that targeted structures are formed when the PSA is taken off. On the one hand, the removal may leave struts of release material behind on the PSA, along which channels are formed through which, for example, air inclusions can escape. On the other hand, the removal may leave islands of release material behind on the PSA, which are surrounded entirely by exposed PSA and so are able as before to assure an effective barrier against air and vapor.

It has surprisingly been found, furthermore, that the weakened regions can be arranged on the surface of films in such a way that the release material which is removed together with the PSA, and which remains on the self-adhesive surface of the PSA, has only a minor adverse effect on the adhesion of the PSA and does not lead to any significant detractions.

It has surprisingly been found, moreover, that in the case of films wound against themselves, adhesive tapes for example, the vacancies which are formed in the weakened regions during unwinding, within the release material, are advantageous for adhesion in the case of overlap bonding of the films, adhesive tapes for example. At the same time, this advantage is not negated by those regions of the PSA on the opposite surface side that are covered with release material and hence adversely affected in terms of their adhesion.

The film of the invention is typically a comparatively thin material produced in sheets from plastic.

The film of the invention comprises a carrier layer, which may optionally be multi-ply, in which case the individual plies may be made of different materials and may have different thicknesses. For example, the carrier layer may have a three-ply configuration—that is, may comprise an inner ply between two outer plies. Also possible in the invention, however, is for the carrier layer to consist only of a single ply. With preference in the invention, the carrier layer of the invention comprises 1, 2, 3, 4, 5, 6 or 7 plies. Where the carrier layer of the invention is of multi-ply configuration, it may have a cross-sectionally symmetrical or asymmetrical construction in terms of its plies, with the symmetry extending not only to the particular material but also to its thickness. A symmetrical construction is preferred.

In one preferred embodiment, the carrier layer consists only of a single-ply polymeric film. In a further preferred embodiment, the carrier layer may be multi-ply, preferably at least two-ply.

The carrier layer has a first surface side and an opposite second surface side. Where the carrier layer is multi-ply, an outer ply of the multi-ply carrier layer forms the first surface side of the carrier layer, and the other outer ply of the multi-ply carrier layer forms the second surface side of the carrier layer.

One of the two surface sides of the carrier layer—referred to as "second surface side" to distinguish it from the other of the two surface sides—has had part of its area modified, specifically (i) by surface activation or (ii) by printing with a printing composition, and so in both cases (i) and (ii) the second surface side has in each case modified regions and also unmodified regions.

For the surface activation in the sense of the invention, all common methods which are known to a skilled person and for which suitable equipment is commercially available are contemplated in principle—in particular, flame treatment, plasma treatment and/or corona treatment. Through these methods the adhesion properties are improved, and materials applied subsequently can be applied with improved adhesion to the carrier layer.

Printing compositions contemplated in the sense of the invention include in principle all materials with which polymeric films can be printed, especially varnishes, which are known to a skilled person and available commercially. The printing composition may comprise a plurality of components—e.g., different varnishes, possibly with different colors—which can be printed one atop another at the same locations and/or at different locations on the second surface side.

The local deactivation of release coatings, in accordance with the invention, may be actualized by different, preferred approaches, which comprise a surface activation and optionally, additionally, printing with a printing composition as well:

(i) part-area surface activation and subsequent full-area coating with release material; the local deactivation of the release coating is in this case based on the only minor adhesion of the release material on the carrier layer in the regions not surface-activated beforehand;

(ii) part-area printing with a printing composition, subsequent full-area surface activation, and subsequent full-area coating with release material; the local deactivation of the release coating is in that case based on the only slight adhesion of the printing composition on the carrier layer in the regions printed beforehand, which were not surface-activated during printing; in the printed regions, the release material is detached together with the underlying printing composition from the carrier layer; and (iii) full-area surface activation, subsequent part-area printing with a printing composition, and subsequent full-area coating with release material; the local deactivation of the release coating is in that case based on the only slight adhesion of the release material on the printing composition in the regions printed beforehand, which were surface-activated before the printing; in the printed regions, the release material is detached from the underlying printing composition, which in turn remains on the carrier layer.

A skilled person recognizes that approaches (i) to (iii) can be actualized by adjusting the respective adhesive force of the individual materials to one another, and that the local deactivation of the release coating is based on a predetermined breaking location determined beforehand. This predetermined breaking location has the lowest adhesive force of the film materials that are directly in contact there. The respective adhesive forces can be influenced in a targeted way through the choice of the materials, through the choice of the surface activation, through the temporal sequence of the production steps, and also through the choice of the PSA, and can be adapted by customary, routine tests. Suitable materials are available commercially, and customary adhesive forces of these materials with respect to other materials are stated by the manufacturers.

Where the part-area modification takes place by surface activation, the modified regions are also referred to in the invention as "surface-activated regions", and the unmodified regions are also referred to as "non-surface-activated regions". Where the part-area modification takes place by printing with a printing composition, the modified regions are also referred to in the invention as "printed regions", and the unmodified regions are also referred to as "unprinted regions". In so far as there is first an (optionally full-area) surface activation and subsequently a part-area printing with a printing composition, the modified regions are also referred to in the invention as "printed surface-activated regions" and the unmodified regions as "unprinted surface-activated regions". In so far as there is first a part-area printing with a printing composition and subsequently an (optionally full-area) surface activation, the modified regions are also referred to in the invention as "surface-activated printed regions" and the unmodified regions as "surface-activated unprinted regions".

The modified regions and also the unmodified regions are coated in the invention with a release material over some or all of their area. The coating is preferably full-area, i.e., the second surface side of the carrier layer has had preferably its full area coated with the release material, and this coating preferably forms one of the two outer sides of the film.

The adhesion of the release material against the carrier layer in the modified regions is different in degree in comparison to the adhesion of the release material against the carrier layer in the unmodified regions. The adhesion, for example, of the release material "against the carrier layer" is to be distinguished in the invention from the adhesion, for example, of the release material "to the carrier layer" (=adhesion "on the carrier layer"). Whereas the adhesion of the release material "to the carrier layer" (=adhesion "on the carrier layer") requires direct contact of the release material and the carrier layer, it is additionally possible in the case of the adhesion of the release material "against the carrier layer" for there to be a further material present between the carrier layer and the release material, this further material being preferably, in the invention, a printing composition. On detachment of such a release material, which adheres only indirectly, through a printing composition, against the carrier layer, the printing composition may either be detached together with the release material (approach (ii)) or else may remain on the carrier layer (approach (iii)).

The relative difference between the adhesion of the release material against the carrier layer in the modified regions and the adhesion of the release material against the carrier layer in the unmodified regions is preferably at least ±1 N/cm according to EN ISO 11339, preferably at least ±2 N/cm, or at least ±3 N/cm, or at least ±4 N/cm, or at least ±5 N/cm, or at least ±6 N/cm, or at least ±7 N/cm.

The modified regions and also the unmodified regions have preferably each had their full area coated with the release material.

In one preferred embodiment, the total area of all the modified regions is less than the total area of all the unmodified regions. The total area of all the modified regions is preferably at most 45%, or at most 40%, or at most 35%, or at most 30%, or at most 25%, or at most 20%, or at most 15%, or at most 10%, or at most 5% of the total area of the second surface side of the carrier layer.

In another preferred embodiment, the total area of all the modified regions is greater than the total area of all the unmodified regions. The total area of all the modified regions is preferably at least 55%, or at least 60%, or at least 65%, or at least 70%, or at least 75%, or at least 80%, or at least 85%, or at least 90%, or at least 95% of the total area of the second surface side of the carrier layer.

The modified regions preferably form a uniform, repeating pattern.

In one preferred embodiment, the modified regions are each surrounded over their full area by unmodified regions. In another preferred embodiment, the unmodified regions are each surrounded over their full area by modified regions. These embodiments are especially advantageous when the intention is to ensure imperviosity, against water, vapor and/or air, for example, as may be desirable in the case of adhesive tapes for the building sector, for example.

In a further preferred embodiment, the modified regions extend in each case over the entire transverse or longitudinal extent of the film of the invention, optionally after the trimming thereof to the desired width and/or length. These embodiments are especially advantageous when permeability is to be ensured, against water, vapor and/or air, for example, as may be desirable in the case of bitumen sheets for the building sector, for example.

The carrier layer or at least one ply of the optionally multi-ply carrier layer is preferably based on a material selected from the group consisting of polyolefin (e.g., polyethylene, polypropylene), polyamide, polyester, elastomer, paper, sheetlike textile structures (e.g., woven fabric, knitted fabric, Tyrak).

The carrier layer preferably consists at least to an extent of 95 wt % of C2-C8 olefin polymers, their mixtures or copolymers.

The carrier layer may have been monoaxially or biaxially oriented, but preferably is unoriented.

Preferred polyolefins are polyolefins and/or olefin copolymers of α,β-unsaturated olefins having 2-8 carbon atoms. The polyolefins are preferably selected from the group consisting of polyethylene (PE); preferably polyethylene with a low density of between 0.86 and 0.93 g/cm$^3$ (LDPE); linear polyethylene with a low density of between 0.86 and 0.94 g/cm$^3$ (LLDPE), which as well as ethylene may comprise as comonomer one or more α-olefins having 3-8 carbon atoms; polyethylene with a medium density of between 0.926 and 0.94 g/cm$^3$ (MDPE); polyethylene with a high density of between 0.94 and 0.97 g/cm$^3$ (HDPE); or ethylene copolymers with an α-olefin having 4 or more carbon atoms, preferably 6 and/or 8 carbon atoms, (mPE); polypropylenes (PP) or propylene-ethylene copolymers having preferably up to 20 wt % of ethylene. Suitable polypropylene preferably includes isotactic propylene homopolymers having a melting point of 140-170° C., preferably 150-165° C. As propylene copolymers it is additionally possible to use at least one copolymer of propylene and up to 20 wt %, preferably 10 wt %, based on the copolymer, of ethylene as a blend component.

The ply or plies of the carrier layer may each have the same or different additives and/or auxiliaries selected from the group encompassing antioxidants, antiblocking agents, antifogging agents, antistats, active antimicrobial ingredients, light stabilizers, UV absorbers, UV filters, dyes, color pigments, stabilizing agents, preferably heat stabilizers, process stabilizers, and UV and/or light stabilizers, preferably based on at least one sterically hindered amine (HALS), process auxiliaries, flame retardants, nucleating agents, crystallization agents, preferably crystal seed formers, lubricants, optical brighteners, plasticizers, silanes, spacers, fillers, such as $CaCO_3$, silicates, peel additives, seal additives, waxes, wetting agents, surface-active compounds, preferably surfactants, and dispersants.

The ply or plies of the carrier layer may comprise at least 0.01-15 wt %, preferably at least 0.1-10 wt %, based in each case on the total weight of an individual ply, of at least one of the aforementioned additives.

The optionally multi-ply carrier layer preferably has in total a mean layer thickness in the range from 10 μm to 200 preferably 50 μm to 200 more preferably 60 μm to 150 very preferably 70 μm to 90

The film of the invention has a coating with a release material on the second surface side of the film in order to improve its release effect.

The coating is based preferably on a cured release material, preferably a polysiloxane coating, which has been applied to at least one surface of the film of the invention over substantially the full area, preferably with the exception of at least one strip running in machine direction, or over part of the area, preferably as a precisely repeating transverse strip.

The release material is preferably based on a material selected from the group consisting of thermally curing polysiloxanes, photochemically curing polysiloxanes (e.g., photochemically radically or photochemically cationically), and a mixture thereof (i.e., thermally curing polysiloxanes and/or photochemically curing polysiloxanes).

The term "polysiloxane" refers in the sense of the invention to compounds whose polymer chains are composed in alternation of silicon atoms and oxygen atoms. A polysiloxane is based on n repeating siloxane units (—[Si(R$^2$)—O]—)n, which in each case independently of one another are disubstituted by two organic radicals R, with R preferably being in each case R$^1$ or OR' and R$^1$ in each case being an alkyl radical or an aryl radical. The cured release material is preferably based on a repeating dialkylsiloxane unit or on a repeating alkylarylsiloxane unit. Depending on the number of Si—O bonds in a single siloxane unit, based in each case on a tetravalent silicon atom, these units can be differentiated into terminal monofunctional siloxanes (M) having one Si—O bond, difunctional siloxanes (D) having two Si—O bonds, trifunctional siloxanes (T) having three Si—O bonds, and tetrafunctional siloxanes (Q) having four Si—O bonds. The release material of the invention preferably has a crosslinked annular or catenary structure, more preferably a crosslinked catenary structure, which is linked by (D), (T) and/or (Q) units into a two- or three-dimensional network. The number n of the repeating siloxane units [Si($R^2$)—O]-)n in the polysiloxane chain is referred to as the degree of polymerization of the polysiloxane.

The cured release material of the film of the invention is based preferably on at least one cured, i.e., crosslinked, polysiloxane selected from the group encompassing addition-crosslinked, preferably addition-crosslinked with metal catalysis, condensation-crosslinked, radically crosslinked and/or cationically crosslinked polysiloxanes.

The release material is based more preferably on at least one cured polysiloxane, where the curing has been induced thermally and/or with exposure to UV radiation.

In one preferred embodiment, the release material is based on at least one silicone component selected from the group consisting of acrylic-modified polysiloxanes and epoxysiloxanes, the curing thereof being induced in each case by UV radiation. UV-cured silicone components may be obtained by photocatalytically induced radical reaction of acrylic-modified polysiloxanes and/or by photocatalytically induced cationic reaction of epoxysiloxanes.

In another preferred embodiment, the release material is based on at least one cured polysiloxane selected from the group consisting of polydialkylsiloxanes, preferably polydimethylsiloxanes and polyalkylarylsiloxanes, preferably polymethylphenylsiloxanes, the curing of which is induced thermally in each case. Thermally cured polysiloxanes may be obtained by thermal hydrosilylation of polysiloxanes having silane functions with a compound having at least one carbon double bond, or by a condensation reaction of correspondingly modified polysiloxanes.

The UV curing, like the thermal curing as well, takes place after the production of the film of the invention; the invention prefers thermal curing.

The release material preferably has a mean surface weight in the range from 0.1 $g/m^2$ to 2 $g/m^2$, more preferably 0.3 $g/m^2$ to 1 $g/m^2$.

The film preferably has a total layer thickness in the range from 10 μm to 200 preferably 50 μm to 200 more preferably 60 μm to 150 very preferably 70 μm to In one preferred embodiment (approach (i)), the adhesion of the release material against the carrier layer in the modified regions is stronger than the adhesion of the release material against the carrier layer in the unmodified regions.

The modified regions have preferably been modified by surface activation, and so the modified regions are surface-activated regions and the unmodified regions are non-surface-activated regions; and the surface-activated regions and also the non-surface-activated regions having had some or all of their area coated with the release material.

The surface activation is preferably selected from the group consisting of plasma treatment, corona treatment, flame treatment, and combinations thereof.

In another preferred embodiment (approach (ii) or (iii)), the adhesion of the release material against the carrier layer in the modified regions is weaker than the adhesion of the release material against the carrier layer in the unmodified regions.

In this case, the modified regions have preferably been modified by printing with a printing composition, and so the modified regions are printed regions and the unmodified regions are unprinted regions; and the printed regions and also the unprinted regions having had some or all of their area coated with the release material.

The adhesion of the release material on the printing composition in the printed regions and the adhesion of the release material on the second surface side in the unprinted regions are preferably in each case stronger than the adhesion of the printing composition on the second surface side in the printed regions.

The printing composition is based preferably on a material selected from the group consisting of one-component varnishes, two-component varnishes, waterborne varnishes, solvent borne varnishes, thermally crosslinking varnishes, photochemically crosslinking varnishes, radically crosslinking varnishes, cationically crosslinking varnishes, varnishes based on acrylates, varnishes based on polyvinyl chloride (PVC), varnishes based on polyvinyl dichloride (PVDC), varnishes based on polyurethane, varnishes based on polyamide, and/or varnishes based on nitrocellulose.

The printing composition in the printed regions preferably has a mean surface weight in the range from 0.5 $g/m^2$ to 10 $g/m^2$.

In one preferred embodiment, the first surface side has had some or all of its area coated with a pressure-sensitive adhesive. This is particularly advantageous if the film of the invention is or is to be wound against itself.

The first surface side has preferably had its whole area coated with the pressure-sensitive adhesive.

The pressure-sensitive adhesive is preferably based on a material selected from the group consisting of acrylate-based pressure-sensitive adhesives, rubber-based pressure-sensitive adhesives, polyisobutylene-based pressure-sensitive adhesives, and hotmelts (e.g., SBS block copolymers).

The pressure-sensitive adhesive preferably has a mean surface weight in the range from 50 $g/m^2$ to 500 $g/m^2$, more preferably 50 $g/m^2$ to 400 $g/m^2$, more preferably still 50 $g/m^2$ to 300 $g/m^2$, very preferably 150 $g/m^2$ to 300 $g/m^2$.

Preferably, in a state in which the pressure-sensitive adhesive adheres to the release material, the adhesion of the release material on the second surface side in the unmodified regions is weaker than the adhesion of the pressure-sensitive adhesive on the release material.

Preferably, in a state in which the pressure-sensitive adhesive adheres to the release material, the adhesion of the release material on the second surface side in the modified regions is stronger than the adhesion of the pressure-sensitive adhesive on the release material.

Preferably, in a state in which the pressure-sensitive adhesive adheres to the release material, the adhesion of the release material on the second surface side in the unmodified regions is stronger than the adhesion of the pressure-sensitive adhesive on the release material.

The modified regions have preferably been modified by printing with a printing composition, and, in a state in which the pressure-sensitive adhesive adheres to the release material, the adhesion of the pressure-sensitive adhesive on the release material is stronger than the adhesion of the printing composition on the second surface side in the printed regions.

A further aspect of the invention relates to an adhesive tape which comprises the above-described film of the invention.

The film of the invention may be provided as a self-adhesive film, preferably as an adhesive tape in the form of a roll. Accordingly, the film has a coating of a release material on one of its two surface sides, and has a coating of a pressure-sensitive adhesive on the other of its two surface sides. If the adhesive tape is unwound from the roll, there is partial detachment of the release material, which remains partially adhering to the pressure-sensitive adhesive. As a result, the pressure-sensitive adhesive on the one hand is locally deactivated; on the other hand, however, the coating with the release material is also interrupted. The adhesion of the adhesive tape to itself on overlap bonding is improved in such a way that there are no significant detractions in the effect in the case of nonoverlapping bonding. There is no need at all for release films.

The film is preferably wound against itself and takes the form of a roll, so that the pressure-sensitive adhesive adheres to the release material.

The modified regions have been modified preferably by surface activation, the formulation of the adhesive tape in that case being such that during unwinding, in the non-surface-activated regions, the release material remains adhering to the pressure-sensitive adhesive and is detached from the second surface side; in the surface-activated regions, the pressure-sensitive adhesive is detached from the release material; so that within the coating of the second surface side with the release material, in the non-surface-activated regions, vacancies are formed which have no release material, but instead at which the second surface side is exposed; and also, on the coating of the first surface side with the pressure-sensitive adhesive, regions corresponding thereto are formed, which are covered with the detached release material adhering thereto.

The modified regions have been modified preferably by printing with a printing composition, the adhesive tape being formulated in this case such that during unwinding, in the unprinted regions, the pressure-sensitive adhesive is detached from the release material; in the printed regions, the release material together with the printing composition remains adhering to the pressure-sensitive adhesive, and the printing composition is detached from the second surface side; so that within the coating of the second surface side with the release material, in the printed regions, vacancies are formed which have no release material, but at which instead the second surface side is exposed; and also, on the coating of the first surface side with the pressure-sensitive adhesive, regions corresponding thereto are formed, which are covered with the detached release material adhering thereto and additionally with the printing composition.

A further aspect of the invention relates to the use of an above-described film of the invention or of an above-described adhesive tape of the invention for sticking to surfaces and/or for sealing openings.

The film or the adhesive tape preferably comprises a first section and a second section, which are bonded overlappingly in a manner such that at least a part-area of the pressure-sensitive adhesive of the first section, in the region of at least some of the vacancies of the second section, adheres to the second surface side exposed there.

A further aspect of the invention relates to the use of an above-described film of the invention as a release film. In this case, preferably, an article furnished with a self-adhesive material is contacted with the release film in a manner such that the self-adhesive material adheres over all of the area or some of the area to the release material of the release film, and wherein the release film and the article are thereafter or later separated from one another again, whereby the self-adhesive material is at least partly detached again from the release material. The period elapsing between the contacting (adhering) and the detaching is not restricted in the invention and may amount to from seconds or years.

In one preferred embodiment, the modified regions have been modified by surface activation, and the release film is used in the invention in such a way that on detachment, in non-surface-activated regions, the release material remains adhering to the self-adhesive material and is detached from the second surface side; in surface-activated regions, the self-adhesive material is detached from the release material; so that within the coating of the second surface side with the release material, in the non-surface-activated regions, vacancies are formed which have no release material but at which, instead, the second surface side is exposed; and also, on the self-adhesive material of the separated article, regions corresponding thereto are formed, which are covered with the detached release material adhering thereto.

In another preferred embodiment, the modified regions have been modified by printing with a printing composition, and the release film is used in the invention in such a way that on detachment, in unprinted regions, the self-adhesive material is detached from the release material; in printed regions, the release material remains adhering together with the printing composition to the self-adhesive material, and the printing composition is detached from the second surface side; so that within the coating of the second surface side with the release material, in the printed regions vacancies are formed which have no release material but at which, instead, the second surface side is exposed; and also, on the self-adhesive material of the separated article, regions corresponding thereto are formed, which are covered with the detached release material adhering thereto and additionally with the printing composition.

The self-adhesive material is preferably an adhesive according to DIN EN 923, i.e., a nonmetallic substance which joins adherends by surface sticking (adhesion) and internal strength (cohesion) and/or is suitable for generating such joining. The self-adhesive material is preferably a chemically curing adhesive or a physically setting adhesive. The self-adhesive material is preferably selected from reactive adhesives, pressure-sensitive adhesives, hotmelt adhesives, and dispersion-based adhesives.

The article is preferably selected from adhesive tapes and bitumen sheets.

A further aspect of the invention relates to a system which comprises an article furnished with a self-adhesive material, and also a film of the invention as described above, wherein the film covers the self-adhesive material and wherein the release material of the film is facing the self-adhesive material of the article and adheres thereto. The article may, for example, be configured as a self-adhesively furnished bitumen sheet, with the film of the invention serving as a release film for the self-adhesive surface of the bitumen sheet. The self-adhesive material is preferably selected from reactive adhesives, pressure-sensitive adhesives, hotmelt adhesives, and dispersion-based adhesives.

A further aspect of the invention relates to methods for producing the above-described film of the invention, comprising the following successive steps:
 (i) providing an optionally multi-ply carrier layer having a first surface side and an opposite second surface side;
 (ii) modifying some of the area of the second surface side either by surface activation or by printing with a printing composition, so that modified regions and also unmodified regions are produced on the second surface side; and (iii) coating some or all of the area of the modified regions and also of the unmodified regions with a release material.

In principle the film of the invention may be produced by known production methods such as, for example, by extrusion or by coextrusion.

The carrier layer here, optionally with all of its plies, may be produced by extrusion, more particularly by blown film extrusion and/or flat film extrusion (cast extrusion), or by coextrusion, preferably by blown film coextrusion and/or flat film coextrusion (cast coextrusion), with preference being given to blown film (co)extrusion. In this context it should be ensured that in the case of doping of individual plies with additives, said additives are employed, for processing, by blending, optionally as a masterbatch, with the polymer component or components of the respective ply. This blending may take place in dry pellet/powder form or pellet/pellet form. It is also possible, however, for the additive to be added to the melted polymer component(s) of the respective ply, preferably by metered addition in an extruder used for extruding the respective layer.

In the case of production by extrusion, the single-ply carrier layer or, respectively, the melts corresponding to the individual plies of the multi-ply carrier layer are (co)extruded simultaneously and jointly through a circular die or a flat die; the resulting carrier layer, where a circular die is used, is inflated with air and chilled, or, where a flat die is used, is taken off for consolidation, using rollers, and chilled.

Subsequently, after interim storage where appropriate, a coating with the release material is applied to at least one surface side of the carrier layer.

The film of the invention may have embossing and may exhibit a single-sided embossed structure on one of its surface layers, or an embossed structure throughout, having corresponding male and female sides.

The embossing of the film of the invention may be produced in a flat film extrusion process single-sidedly in line. In that case the polymer melt is poured through the die gap onto a structured, chilled roller, and shaped into a film using counter-rollers. The structured roller transfers its structure only to one side of the film.

The embossing of the film of the invention may be produced in a blown film extrusion process throughout in line. In this case the film, in preheated form, is drawn through an embossing gap between a structured chilled steel roller and an unstructured rubber roller. The steel roller transfers the structure of the steel roller to the steel roller side of the film, with a negative structure of the structure of the steel roller being reproduced on the opposing side, on the rubber roller side, as a result of the elastic rubber roller.

The embossing of the film of the invention may also be produced by the blown film extrusion process or flat film extrusion process off line throughout. In this case the film in preheated form in a further process step is drawn through an embossing gap between a structured, chilled steel roller and an unstructured rubber roller. The steel roller transfers the structure of the steel roller to the steel roller side of the film, with a negative structure of the structure of the steel roller being reproduced on the opposing side, on the rubber roller side, as a result of the elastic rubber roller.

The structure to be embossed is established by the methods which are customary and known to the skilled person, where specific methods may be of particular advantage according to structure and materials. Fundamentally, the structures on the embossing roller may either have a continuous structure or else may take the form of an interrupted structure (sequence of individual embossed structures), with a combination of both structures also being possible. The respective structures on the embossing roller may have any of a very wide variety of different geometric shapes, depending on the intended (asymmetrical) structure of the polymeric film. Preference here is given to a regular structure.

The film of the invention is preferably not embossed.

In one preferred embodiment of the method of the invention (approach (i)), in step (ii) there is a part-area surface activation of the second surface side, so that, on the second surface side, surface-activated regions and also non-surface-activated regions are produced; and wherein, in step (iii), there is a part-area or full-area coating of the surface-activated regions and also of the non-surface-activated regions with a release material.

In another preferred embodiment of the method of the invention (approach (ii)), step (ii) comprises the following successive substeps:
 (ii-1) part-area printing of the second surface side with a printing composition, so that, on the second surface side, printed regions and also unprinted regions are produced; and
 (ii-2) part-area or full-area surface activation of the second surface side, so that, on the second surface side, surface-activated printed regions and also surface-activated unprinted regions are produced; and
 wherein, in step (iii), there is a part-area or full-area coating of the surface-activated printed regions and also of the surface-activated unprinted regions with a release material.

In a further preferred embodiment of the method of the invention (approach (iii)), step (ii) comprises the following successive substeps:
 (ii-a) part-area or full-area surface activation of the second surface side, so that on the second surface side, surface-activated regions and also non-surface-activated regions are produced; and
 (ii-b) part-area printing of the second surface side with a printing composition, so that on the second surface side, printed surface-activated regions and also unprinted surface-activated regions are produced; and
 wherein, in step (iii), there is a part-area or full-area coating of the printed surface-activated regions (7*d*) and also of the unprinted surface-activated regions (8*d*) with a release material.

The invention is illustrated in more detail by the figures.

FIG. 1A shows, schematically, one preferred method for producing the film of the invention (approach (i)) in a plan view of the second surface side (4). A sheet of the carrier layer (2) is guided in the arrow direction in succession through an apparatus for surface activation (14) and an apparatus for coating with release material (15). The surface side (4) of the carrier layer (2) is first of all surface-activated over part of its area by means of the apparatus for surface activation (14), to generate surface-activated regions (7*a*) and non-surface-activated regions (8*a*). Subsequently, using the apparatus for coating with release material (15), the surface-activated regions (7*a*) and the non-surface-activated regions (8*a*) are coated with release material. In the non-surface-activated regions (8*a*), the adhesion of the release material to the carrier layer (2) is weaker than in the surface-activated regions (7*a*).

FIG. 1B shows, schematically, the local detachment of the release material (9) from the carrier layer (2) in the non-surface-activated regions (8*a*), after, for example, a pressure-sensitive adhesive has been applied over the full area to the release material (9) and detached again. Here, on the one hand, in the non-surface-activated regions (8*a*), the adhesion of the pressure-sensitive adhesive to the release material (9) is stronger than the adhesion of the release material (9) to the carrier layer (2), and so the release material (9) is detached together with the pressure-sensitive adhesive (FIG. 1B, right). Here, on the other hand, in the surface-activated regions (7a), the adhesion of the pressure-sensitive adhesive to the release material (9) is weaker than the adhesion of the release material (9) to the carrier layer (2), and so the pressure-sensitive adhesive is detached from the release material (9) and it remains on the carrier layer (2) (FIG. 1B, left).

Figure 2:
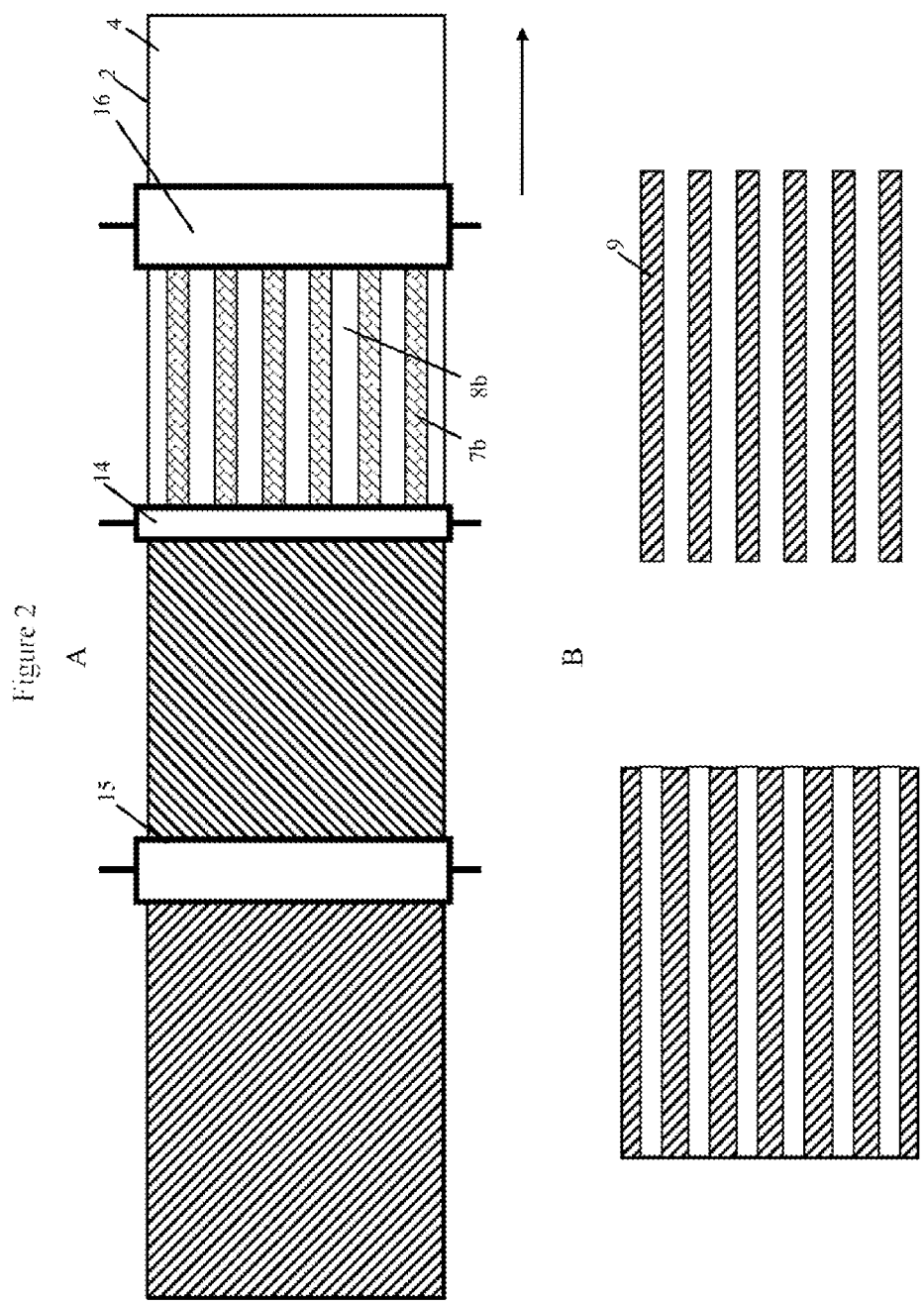

FIG. 2A shows, schematically, another preferred method for producing the film of the invention (approach (ii)) in a plan view of the second surface side (4). A sheet of the carrier layer (2) is guided in the arrow direction in succession through an apparatus for printing with a printing composition (16), an apparatus for surface activation (14), and an apparatus for coating with release material (15). The surface side (4) of the carrier layer (2) is first of all printed over part of its area with a printing composition (6), using the apparatus for printing with a printing composition (16), to produce printed regions (7b) and unprinted regions (8b). Thereafter the surface side (4) of the carrier layer (2) is surface-activated over its full area using the apparatus for surface activation (14), to produce surface-activated printed regions (7c) and surface-activated unprinted regions (8c). Subsequently, using the apparatus for coating with release material (15), the surface-activated printed regions (7c) and the non-surface-activated unprinted regions (8c) are coated over their full area with release material (9). In the surface-activated printed regions (8c), the adhesion of the printing composition (6) (together with the release material (9) located over it) to the carrier layer (2) is weaker than the adhesion of the release material (9) to the carrier layer (2) in the surface-activated unprinted regions (7c).

FIG. 2B shows, schematically, the local detachment of the release material (9) together with the printing composition (6) from the carrier layer (2) in the surface-activated printed regions (7c), after, for example, a pressure-sensitive adhesive has been applied over the full area to the release material (9) and detached again. Here, on the one hand, in the surface-activated printed regions (7c), the adhesion of the pressure-sensitive adhesive to the release material (9) and the adhesion of the release material (9) to the printing composition (6) are in each case stronger than the adhesion of the printing composition (6) to the carrier layer (2), and so the printing composition (6) is detached together with the release material (9) and the pressure-sensitive adhesive (FIG. 2B, right). Here, on the other hand, in the surface-activated unprinted regions (8c), the adhesion of the pressure-sensitive adhesive to the release material (9) is weaker than the adhesion of the release material (9) to the carrier layer (2), and so the pressure-sensitive adhesive is detached from the release material (9) and it remains on the carrier layer (2) (FIG. 2B, left).

FIG. 3 shows, schematically, one preferred embodiment of the film of the invention (approach (ii)) in a cross section through an adhesive tape. The film (1) has a carrier layer (2), which has been coated on its first surface side (3) with a pressure-sensitive adhesive (5). The second surface side (4) of the carrier layer (5) has been printed in printed regions (7b) with a printing composition (6), while the unprinted regions (8b) have no printing composition. Both the printed regions (7b) and the unprinted regions (8b) have been coated with a release material (9).

FIG. 4A shows, schematically, the embodiment of the film of the invention as per FIG. 3 (approach (ii)) in a cross section, where two strips of the film (1) and (1') have been bonded against themselves, so that the pressure-sensitive adhesive (5) of the film (1) adheres on the release material (9) of the strip (1').

FIG. 4B shows, schematically, the embodiment of the film of the invention as per FIG. 4B, after film (1) has been peeled off from film (1'). The modified regions (8) have been modified by printing with a printing composition (6), the formulation of the adhesive tape being such that on unwinding, in the unprinted regions (8b), the pressure-sensitive adhesive (5) is detached from the release material (9); in the printed regions (7b), the release material (9) together with the printing composition (6) remains adhering to the pressure-sensitive adhesive (5), and the printing composition (6) is detached from the second surface side (4) of the carrier layer (2); as a result, within the coating of the second surface side (4) with the release material (9), in the printed regions (7b), vacancies (10) are formed which have no release material (9), but instead at which the second surface side (4) is exposed; and also, on the coating of the first surface side (3) with the pressure-sensitive adhesive (5), regions (11) corresponding thereto are formed, which are covered with the detached release material (9) adhering thereto, and additionally with the printing composition (6).

Figure 5:
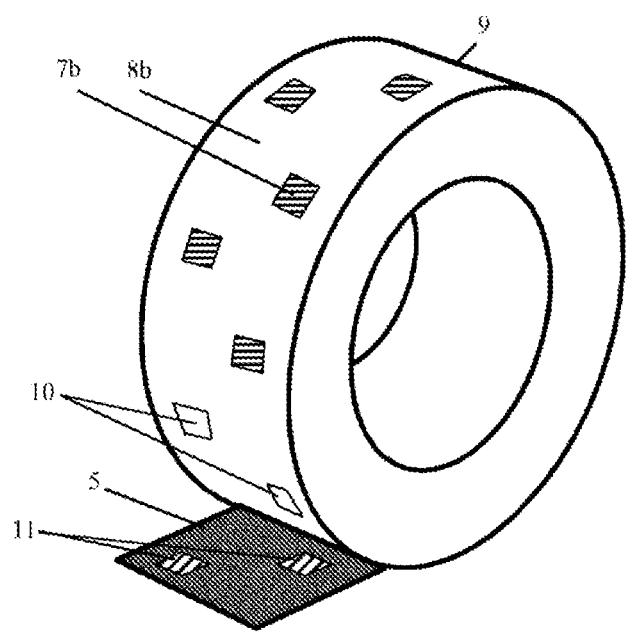

FIG. 5 shows, schematically, the adhesive tape as per FIGS. 4A/B in a perspective view, with the vacancies (10), which have no release material (9) but at which the second surface side (4) is exposed, and also with the corresponding regions (11) on the pressure-sensitive adhesive (5), which are covered with the detached release material (9) adhering thereto and additionally with the printing composition (6).

Figure 6:
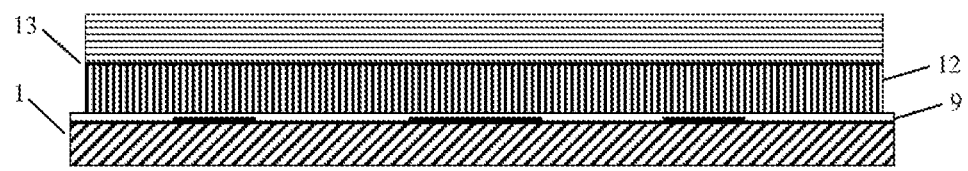

FIG. 6 shows, schematically, a system which comprises an article (13), furnished with a self-adhesive material (12), and also a film (1) of the invention, where the film (1) covers the self-adhesive material (12) and where the release material (9) of the film (1) is facing the self-adhesive material (12) of the article (13) and adheres thereto.

LIST OF REFERENCE SYMBOLS

1 Film
2 Carrier layer
3 First surface side
4 Second surface side
5 Pressure-sensitive adhesive
6 Printing composition
7 Modified regions
7a Surface-activated regions
7b Printed regions
7c Surface-activated printed regions
7d Printed surface-activated regions
8 Unmodified regions
8a Non-surface-activated regions
8b Unprinted regions
8c Surface-activated unprinted regions
8d Unprinted surface-activated regions
9 Release material
10 Vacancies
11 Corresponding regions
12 Self-adhesive material
13 Article
14 Apparatus for surface activation
15 Apparatus for coating with release material
16 Apparatus for printing with a printing composition

What is claimed is:

1. A film comprising a carrier layer having a first surface side and an opposite second surface side;
   wherein some or all of an area of the first surface side is coated with a pressure-sensitive adhesive;
   wherein the second surface side has had some of its area modified either
      by surface activation or
      by printing with a printing composition,
   so that the second surface side comprises modified regions and also unmodified regions;
   wherein the modified regions and also the unmodified regions have been coated over some or all of their area with a release material; and
   wherein the adhesion of the release material against the carrier layer in the modified regions is different in degree in comparison to the adhesion of the release material against the carrier layer in the unmodified regions.

2. The film as claimed in claim 1, wherein the adhesion of the release material against the carrier layer in the modified regions is weaker than the adhesion of the release material against the carrier layer in the unmodified regions.

3. The film as claimed in claim 2, wherein the modified regions have been modified by printing with a printing composition, so that the modified regions are printed regions and the unmodified regions are unprinted regions; and wherein the printed regions and also the unprinted regions have had some or all of their area coated with the release material.

4. The film as claimed in claim 3, wherein the adhesion of the release material on the printing composition in the printed regions and the adhesion of the release material on the second surface side in the unprinted regions are in each case stronger than the adhesion of the printing composition on the second surface side in the printed regions.

5. The film as claimed in claim 2, wherein the printing composition is based on a material selected from the group consisting of one-component varnishes, two-component varnishes, waterborne varnishes, solvent borne varnishes, thermally crosslinking varnishes, photochemically crosslinking varnishes, radically crosslinking varnishes, cationically crosslinking varnishes, varnishes based on acrylates, varnishes based on polyvinyl chloride (PVC), varnishes based on polyvinyl dichloride (PVDC), varnishes based on polyurethane, varnishes based on polyamide, and/or varnishes based on nitrocellulose.

6. The film as claimed in claim 1, wherein, in a state in which the pressure-sensitive adhesive adheres to the release material, the adhesion of the release material on the second surface side in the unmodified regions is stronger than the adhesion of the pressure-sensitive adhesive on the release material.

7. The film as claimed in claim 6, wherein the modified regions have been modified by printing with a printing composition, wherein in a state in which the pressure-sensitive adhesive adheres to the release material, the adhesion of the pressure-sensitive adhesive on the release material is stronger than the adhesion of the printing composition on the second surface side in the printed regions.

8. The film of claim 1, wherein the carrier layer includes a material selected from the group consisting of polyolefin, polyamide, polyester, elastomer, and textile structures.

9. The film of claim 8, wherein the carrier layer is multi-ply.

10. The film of claim 1, wherein the printing composition is based on two-component varnishes or waterborne varnishes.

11. The film of claim 1, wherein the printing composition is based on thermally cross-linking varnishes.

12. The film of claim 1, wherein the printing composition is based on radically crosslinking varnishes or cationically crosslinking varnishes.

13. The film of claim 1, the printing composition is based on photochemically crosslinking varnishes.

14. The film of claim 1, wherein the printing composition is based on varnishes based on acrylates, varnishes based on polyvinyl chloride (PVC), varnishes based on polyvinyl dichloride (PVDC), varnishes based on polyurethane, varnishes based on polyamide, and/or varnishes based on nitrocellulose.

15. An adhesive tape comprising a film as claimed in claim 1.

16. The adhesive tape as claimed in claim 15, wherein the film is present as a roll wound against itself, so that the pressure-sensitive adhesive adheres to the release material.

17. The adhesive tape as claimed in claim 16, wherein the modified regions have been modified by printing with a printing composition, wherein the adhesive tape has been formulated such that during unwinding, the pressure-sensitive adhesive is detached from the release material in unprinted regions; in printed regions the release material remains adhering together with the printing composition to the pressure-sensitive adhesive, and the printing composition is detached from the second surface side; so that within the coating of the second surface side with the release material, in the printed regions, vacancies are formed which do not have any release material, but at which instead the second surface side is exposed; and also, on the coating of the first surface side with the pressure-sensitive adhesive, regions corresponding thereto are formed, which are covered with the detached release material adhering thereto and additionally with the printing composition.

18. A method comprising a step of:
   sticking the film as claimed in claim 1 to a surface; or
   sealing an opening with the film as claimed in claim 1.

19. A system comprising an article furnished with a self-adhesive material, and a film as claimed in claim 1, wherein the film covers the self-adhesive material and wherein the release material of the film faces the self-adhesive material of the article and adheres thereto.

20. A method for producing a film as claimed in claim 1, comprising the following successive steps:
   providing an optionally multi-ply carrier layer having a first surface side and an opposite second surface side;
   modifying some of the area of the second surface side either by surface activation or by printing with a printing composition, so that modified regions and also unmodified regions are produced on the second surface side; and
   coating some or all of the area of the modified regions and also of the unmodified regions with a release material.

* * * * *